I. LAZAGA.
WEB FEEDING AND CUTTING DEVICE.
APPLICATION FILED MAY 31, 1919.
1,430,089.
Patented Sept. 26, 1922.
4 SHEETS—SHEET 1.
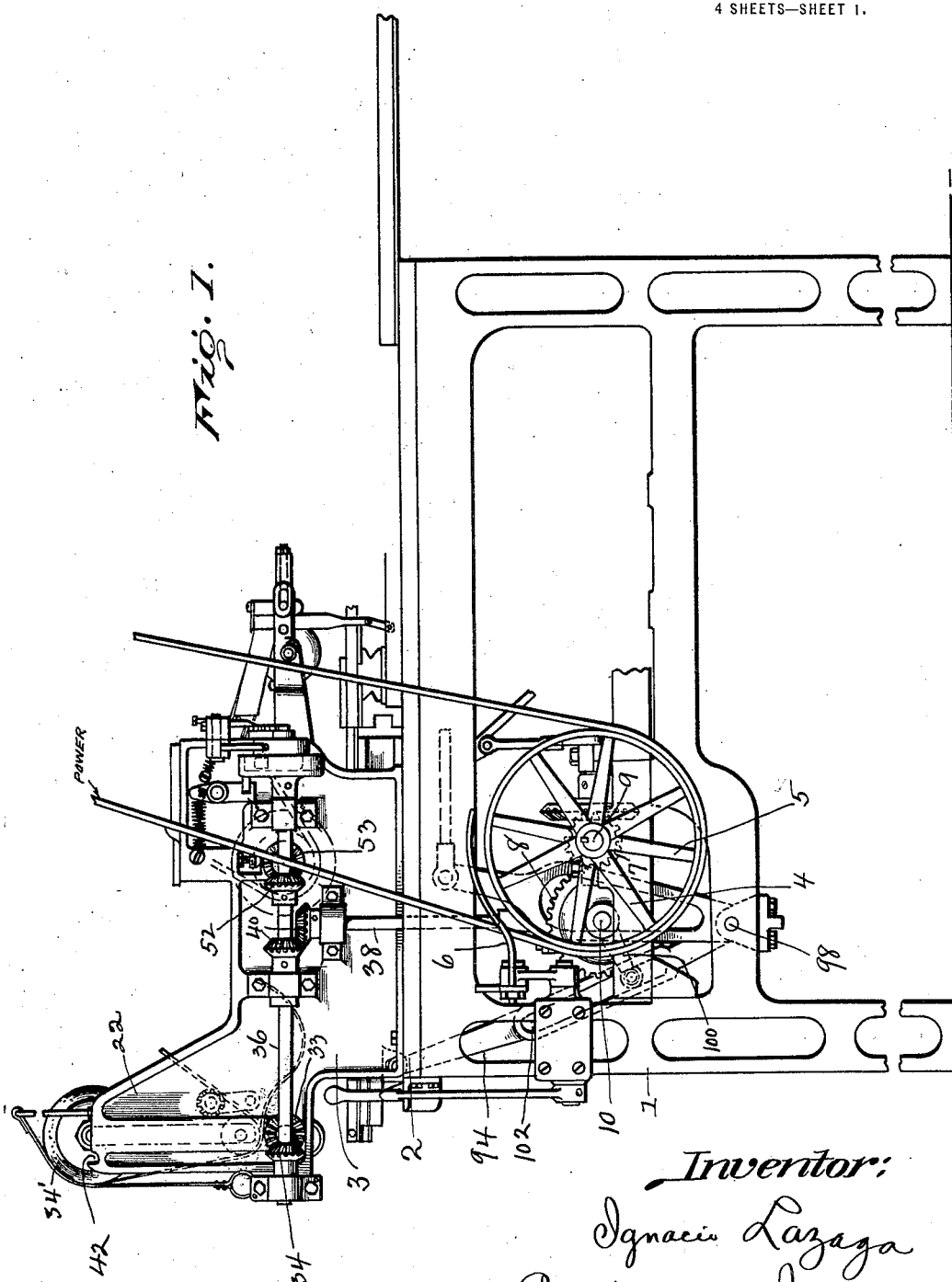
Inventor:
Ignacio Lazaga
By Robertson & Johnson
Attorneys.

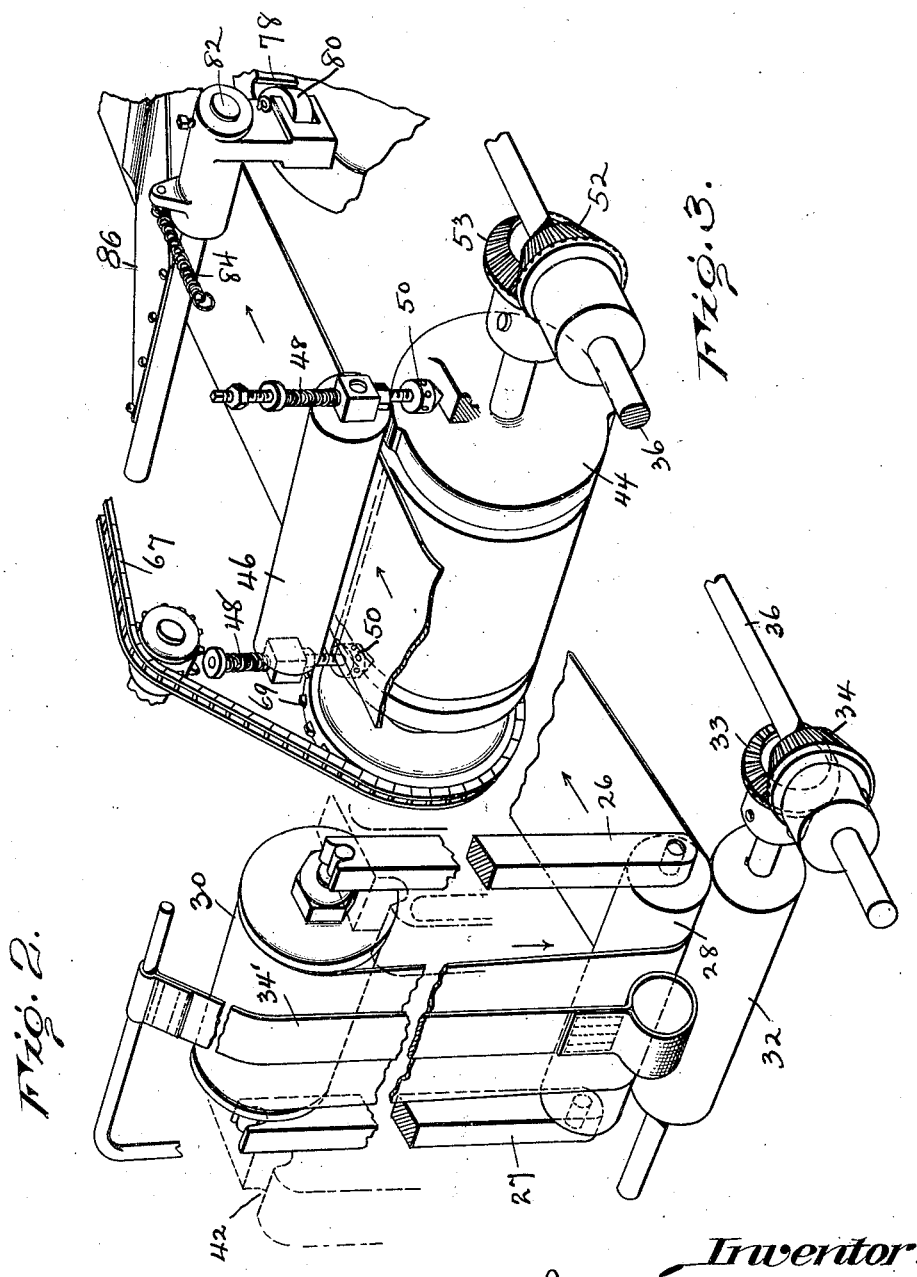

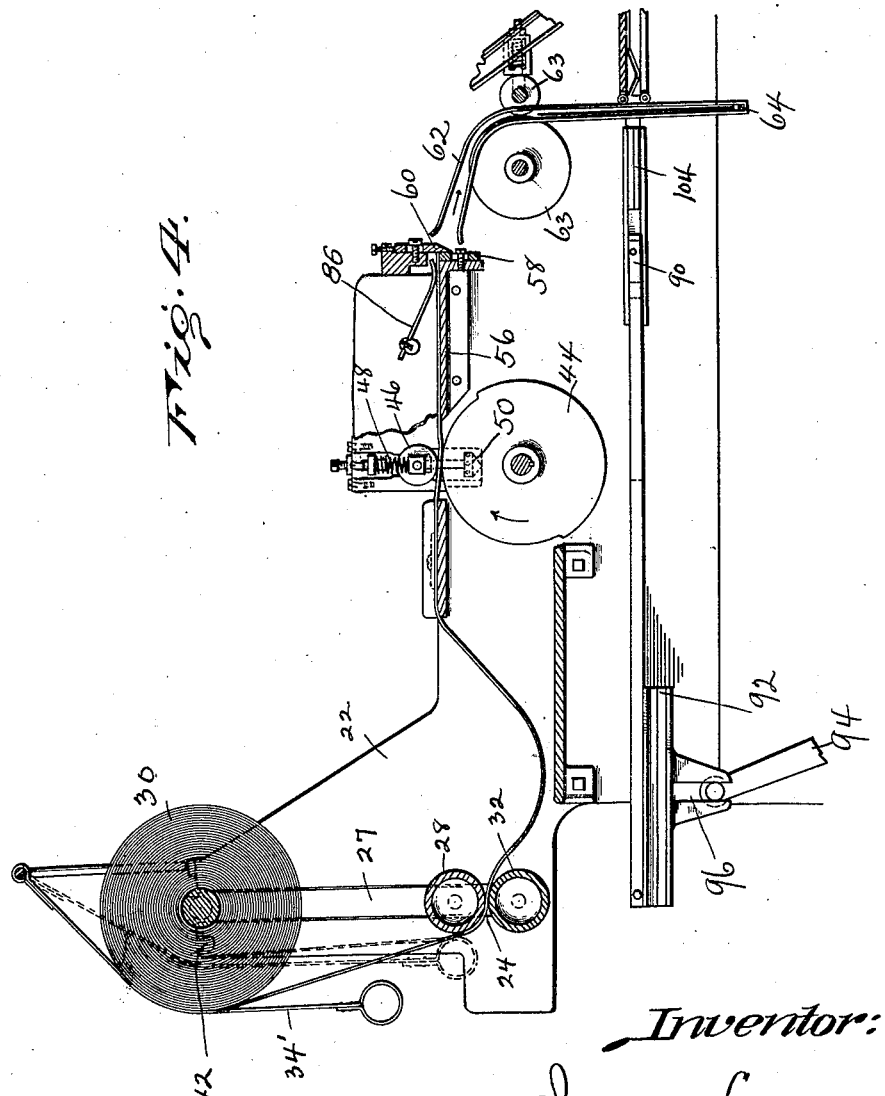

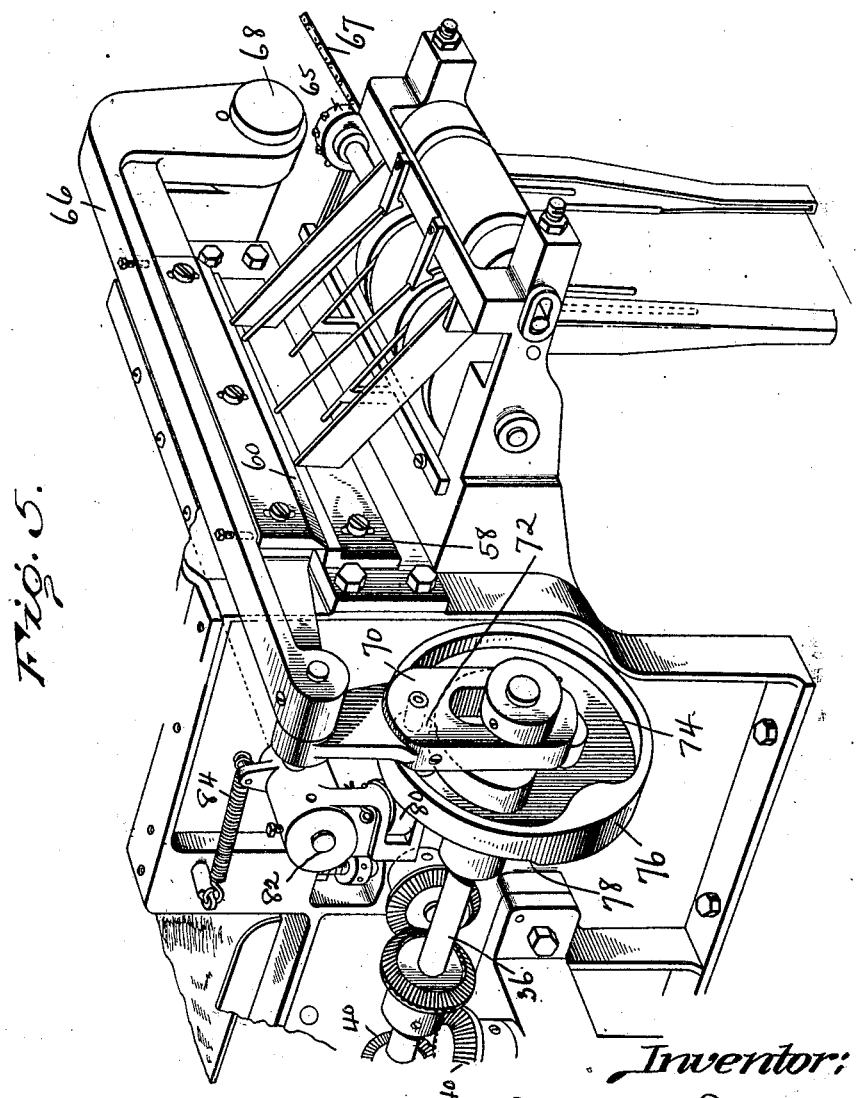

Patented Sept. 26, 1922.

1,430,089

UNITED STATES PATENT OFFICE.

IGNACIO LAZAGA, OF SALEM, VIRGINIA.

WEB FEEDING AND CUTTING DEVICE.

Original application filed December 19, 1918, Serial No. 267,511. Divided and this application filed May 31, 1919. Serial No. 301,008.

*To all whom it may concern:*

Be it known that I, IGNACIO LAZAGA, a citizen of the Republic of Cuba, and a resident of Salem, in the county of Roanoke and State of Virginia, have invented certain new and useful Improvements in Web Feeding and Cutting Devices, of which the following is a specification.

This invention relates to improvements in web feeding and cutting devices and is intended particularly for use in a machine for packaging articles, such for example as shown in my application Serial Number 267,511, filed December 19, 1918, of which this application is a division.

The object of my invention is to provide a machine which will effectively feed thin and delicate material such as tin-foil, feed a measured piece of material of just the proper size to form a wrapper, and to cut the measured piece from the web, in order that it may be utilized in a machine such as that disclosed in the accompanying drawings.

The invention relates to a machine for carrying out the foregoing object, and said machine, in its preferable, though not necessary, embodiment will now be hereinafter described and claimed.

In the drawings accompanying and forming part hereof:

Fig. 1 is a side elevation of a machine having my invention incorporated therein.

Fig. 2 is a perspective view of the tin-foil supporting device.

Fig. 3 is a perspective view of part of the tin-foil measuring and feeding mechanism.

Fig. 4 is a longitudinal section of the rear half of the machine shown in Fig. 1 showing the foil supporting, feeding and measuring mechanism, together with the cutter for severing the measured strip.

Fig. 5 is a perspective view of the mechanism for cutting the measured strip of tin-foil and for feeding the severed strips.

Referring now to the details of the drawings by numerals: 1 designates the main frame of a machine to which my invention may be applied, the machine comprising a bed 2 and an upper framework 3. Power may be supplied to the pulleys 4, 5, as shown, any form of belt shifter 6 being employed as desired. The fast pulley 4 drives the main shaft 9 which, through the gears 7 and 8, drives a transverse counter-shaft 10. No invention is claimed in these driving and counter-shafts, and hence no further description thereof is needed; in fact, they may be changed and modified as desired, and are shown as one way by which the mechanism, upon which the claims of invention are predicated, may be operated. At the rear end of the machine, as shown in Figs. 1 and 4, the upper frame 3 is formed with standards 22, one on each side of the machine. Each standard is formed with a vertical channel or groove 24 into which fits uprights 26 and 27 (see Fig. 2), the lower ends of which are supported by a roller 28 and the upper ends of which are notched to support a reel 30 of the tin-foil. Said lower roller 28 rests upon and is supported by a feed roller 32 driven by bevel gearing 33, 34 from an upper counter-shaft 36, which in turn is driven from a vertical shaft 38 by bevel gearing 40; said shaft 38 being driven from the transverse counter-shaft by gearing (not shown).

The foil or other material from the reel 30 passes downwardly as shown in Fig. 2 and between the two rolls 28 and 32, the lower of which is constantly driven, so that there is a constant feed given to the foil from the reel 30. In order to provide tension upon the foil and keep it taut, a weighted friction device 34' is used as shown in Fig. 2. Inasmuch as the whole weight of the heavy foil reel 30 is carried by the uprights 26 and 27, it follows that all the weight of the foil is carried by the roller 28. When said reel is full, more friction must be exerted between the rollers 28 and 32 to feed the foil than when said reel is smaller and lighter, and by suspending the weight of the reel upon the upper roller 28, the friction is entirely governed by the weight of the foil, so that as the foil is reduced and less friction is needed, there is less weight to cause pressure between said rollers 28 and 32. While the weight of the reel is, when in use, supported by the uprights 26 and 27 and their roller 28, the standards 22 are each provided with a recess 42, see Figs. 1, 2 and 4, into which each trunnion of the reel 30 may be placed when the machine is being provided with a new reel and it is necessary to thread the foil through the rollers 28 and 32 and forward to their measuring devices (to be hereinafter described) and when it is desirable that there shall be no friction placed on the foil.

From the feeding rollers 28 and 32, the foil is passed to a measuring device consisting of two rollers, 44, a measuring roll, and 46, a pressure roll. It is desirable that the feed rollers 28 and 32 constantly feed the foil so that there shall be an even and uniform pull upon the foil whereby it will not be subject to any jerks likely to tear or injure it, and therefore it is advisable to feed the foil so that there shall be "slack" between the feed rolls and the measuring roll 44. To this end the circumference of the measuring roll is preferably equal to twice the length of foil that is to be fed, and in order to feed the foil during only part of the revolution of the measuring roll 44, the latter is formed with its circumference on two diameters as clearly seen in Figs. 3 and 4. The pressure roll 46 is pressed downwardly upon the larger part of the measuring roll 44 by means of the springs 48, Figs. 3 and 4, but said pressure roll cannot be pressed downward upon the reduced part of the measuring roll owing to the fact that adjustable stops 50 are employed. Hence the foil is fed only when the larger part of the measuring roll 44 is opposite the pressure roll 46. Said measuring roll 44 is driven by bevel gearing 52, 53 (see Fig. 3); the gear 52 being upon the same shaft 36 from which the feed roller 32 is constantly driven, and as both sets of gears 33, 34 and 52, 53 are of the same size, it follows the feed roll 32 and the measuring roll each makes a revolution during the same period. Hence as the foil is constantly fed by the rollers 28, 32, and as the constantly rotating measuring roll 44 only feeds the foil during about half of its revolution, it follows that slack is provided in the foil and this slack is designedly just about sufficient to furnish the amount of foil that will be measured off by the measuring roll to form the foil wrapper. As a matter of fact, the circumference of the feed roller 32, instead of being the exact size to feed off the precise amount necessary to form a wrapper, is a small fraction of an inch less than the raised part of the measuring roll 44. This is to prevent an accumulation of slack between the feed rollers 28, 32 and the measuring roll 44. Hence the arrangement illustrated provides a steady uniform feed of the foil from the reel, combined with an intermittent feed after it passes to the feed roll to the point where the measured length is to be severed. The measuring roll 44 and the pressure roll 46 deliver the foil onto a table or support 56, at the end of which are a ledger plate 58 and a movable cutting blade 60, the cutting point of which is distant from a vertical line drawn through the axis of the rolls 44 and 46, the exact amount of foil measured and fed by said rolls. The movable knife 60 is in its raised position while the foil is being measured and fed to the cutter, but after the rolls 44 and 46 cease feeding the foil, the movable knife 60 is caused to descend to the position shown in Fig. 4 and sever the foil so that the measured length to the right of said cutters 58 and 60 drops downward through the chute 62 until it falls and rests upon the stop 64 shown in said Fig. 4, but it will be understood that my present invention is not limited to the means of utilizing the severed strips. However, in order to ensure proper feeding of the severed foil, feed rollers 63—63 are provided, the larger of which is provided with a sprocket 65 (Fig. 5) operated from a sprocket chain 67 receiving motion from a sprocket wheel 69 (Fig. 3) rotating with the measuring roll 44 hereinbefore described. The smaller of the rollers 63 may be spring pressed and the tension of its spring is just sufficient to feed the foil when it is released by the action of the cutters.

The mechanism for moving the cutter 60 downward is shown in Fig. 5. As there shown, the cutter 60 is adjustably fixed to a transverse support 66, pivotally supported at 68, with its front end having a link 70 carrying a cam roller 72 movable in a cam groove 74 in a cam 76 fixed to the counter-shaft 36 before referred to. Said cam 76 has a cam surface 78 on its rear face which operates a cam roller 80 in such manner that when the large part of the cam surface 78 moves against the roller 80, the rock shaft 82 is rocked against the tension of its spring 84. This rock shaft carries a clamp 86, see Figs. 3 and 4, under which the foil passes, and the cam 76 is so timed that its large part 78 acts upon the roller 80 to rock the shaft 82 to move the clamp upon the foil just as the large part of the measuring roll 44 ceases to feed the foil. Therefore, at this moment the foil is clamped in order that, as the cam rotates, it may move the movable cutter 60 downward to sever the foil. During this time, the measuring roll 44 is moving with respect to the foil without feeding it, the cam 76 continues its rotation to move the cutter 60 upward ready for another cut, and the roller 80 moves onto the reduced part of the cam 76, permitting the spring 84 to rock the shaft 82 and slightly lift the clamp 86 to permit the foil to pass under said clamp without restraint as the larger part of the measuring roll 44 again feeds the foil.

Reference has been made to the fact that the severed strip of foil rests vertically upon the stop 64 (Fig. 4). As there shown, it is ready to have the charge of cigarettes (104), or whatever article or articles are being packed (which have, in the meantime, been transferred across the machine by means not illustrated herein as it forms no part of the present invention), shoved forward against the foil to be wrapped therein. This action is accomplished by means of longitudinally movable plates 90 operated from a cross-head 92, which latter and the plates 90 are given an extended backward and forward movement by means of a long link 94, the upper end of which moves in a slot 96 in the bottom of the cross-head 92 and the lower end of which is pivotally supported at 98 (Fig. 1). This link is given movement by means of a crank arm 100 carried by the transverse countershaft 10 before described, said crank arm having its wrist pin movable in a slot 102 in said link 94. It follows from this construction that during one part of the cycle, the link 94, with its cross-head 92 and the plates 90, are moved longitudinally to the right as shown in Fig. 4 to move said plates and the charge of cigarettes (104, Fig. 4) against the wrapper, and during the time a new piece of foil is being measured and severed, said parts 94, 92 and 90 move back to the positions shown in said Fig. 4.

From the foregoing and accompanying drawings, it will be seen that I have invented a web feeding and cutting device capable of feeding the most delicate material in such a manner that it will not possibly be injured owing to the fact that the feed rollers exert a continuous and uniform pull on the delicate material and feed just sufficient slack to throw off the strip to be severed.

It will be obvious that changes and modifications may be made in the various parts of my device without departing from the spirit of the invention, the scope of which may be determined from the appended claims.

What I claim as my invention is:

1. In a wrapping machine, the combination of a reel, a measuring device operating to intermittently feed a measured strip from said reel, constantly operating feed rollers located between said reel and said measuring device arranged to feed "slack" from said reel sufficient to provide said measured portion, and a severing device for cutting off the measured strips, said measuring device feeding the slack directly to said cutting device.

2. In a wrapping machine, the combination of a reel, a measuring roll operating to intermittently feed a measured strip from said reel having feeding and non-feeding portions, the feeding portion arranged to measure and feed a strip from said reel of a length equal to the length of said feeding portion, a constantly operating feeding roller located between said reel and said measuring roller arranged to constantly feed the strip from said reel to form "slack", whereby said feed roller creates a constant and even pull on said reel, a device for severing said measured strip while said measuring roller is not feeding, and said measuring roller arranged to intermittently measure a strip from the "slack" and feed it directly to said cutting device.

3. The combination of a reel, a measuring device operating to intermittently feed a measured strip from said reel, said measuring device comprising a pair of rollers one of which has a part of its periphery larger than the other, and said larger part being arranged to measure off a strip of material, the other of said rollers being held in contact with the larger part of its companion roller by spring pressure, stops arranged to prevent the rollers from contacting when the reduced part of one of the rollers is opposite the companion roller, constantly operating feed rollers located betwen said reel and said measuring device arranged to feed "slack" from said reel sufficient to provide the portion to be measured by said measuring device, and a severing device for cutting off the measured strips, the measuring device feeding the "slack" directly to said cutting device.

4. In a wrapping machine, the combination of a reel, a measuring device for delivering measured strips from said reel comprising two rollers one of which has two different diameters, the length of the larger diameter being equal to the length of the strip to be fed, springs for normally holding one of said rollers against the larger part of the companion roller, and adjustable stops for preventing the rollers from touching when the reduced part of the measuring roller is opposite the companion roller.

5. A web feeding and cutting device including two feeding rollers, cutting means and a measuring device consisting of two rollers, namely a measuring roll and a pressure roll, the measuring roll formed with its circumference on two diameters whereby slack is created in the material between the two sets of rolls and the feed to the cutting means is measured and intermittent.

6. In a wrapping machine, the combination of a reel, a measuring device comprising a pair of rollers adapted to deliver measured strips from said reel, one of said rollers having an enlarged periphery equal in length to the length of the strip to be fed, a severing device, a clamp for holding said strip when it is not being fed, and a cam and operating connections for operating said clamp and severing device during the time when the measuring device is not feeding the strip.

7. In a wrapping machine, the combination of a reel, a measuring device operating to intermittently feed a measured strip from said reel comprising a measuring roller having feeding and non-feeding portions arranged to measure and feed a strip from said roller, of a length equal to the length of said feeding portions, a constantly operating feeding roller between said reel and said measuring roller arranged to constantly feed said strip from said reel to form slack, whereby the feed rollers create a constant and even pull on said reel and the measuring roller intermittently measures a strip from the "slack", a clamp, a severing device, and a cam for clamping the measured strip and for severing the same during the time the strip is opposite the non-feeding portion of said measuring roller.

In testimony whereof I affix my signature in presence of two witnesses.

IGNACIO LAZAGA.

Witnesses:
D. BUNTING,
F. C. SCHOFIELD.